(12) United States Patent
Rached et al.

(10) Patent No.: US 10,119,056 B2
(45) Date of Patent: Nov. 6, 2018

(54) COMPOSITION BASED ON 1,3,3,3,-TETRAFLUOROPROPENE

(75) Inventors: Wissam Rached, Chaponost (FR); Beatrice Boussand, Saint Foy les Lyon (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 13/232,106

(22) Filed: Sep. 14, 2011

(65) Prior Publication Data

US 2012/0068104 A1    Mar. 22, 2012

(30) Foreign Application Priority Data

Sep. 20, 2010 (FR) ..................... 10.57483

(51) Int. Cl.
  *C09K 5/04* (2006.01)
  *C10M 171/00* (2006.01)
(52) U.S. Cl.
  CPC ......... *C09K 5/045* (2013.01); *C10M 171/008* (2013.01); *C09K 2205/126* (2013.01); *C09K 2205/22* (2013.01); *C10M 2207/2835* (2013.01); *C10M 2209/043* (2013.01); *C10N 2220/302* (2013.01); *C10N 2230/06* (2013.01); *C10N 2240/30* (2013.01)
(58) Field of Classification Search
  CPC .............. C09K 5/045; C09K 2205/126; C09K 2205/22; C10M 2207/2835; C10M 2209/043
  See application file for complete search history.

(56) References Cited

U.S. PATENT DOCUMENTS

| | | | |
|---|---|---|---|
| 5,202,044 A | 4/1993 | Hagihara et al. | |
| 8,951,432 B2 | 2/2015 | Boutier et al. | |
| 9,005,468 B2 | 4/2015 | Rached | |
| 9,315,706 B2 | 4/2016 | Boussand | |
| 9,512,343 B2 | 12/2016 | Rached et al. | |
| 2006/0243944 A1 | 11/2006 | Minor et al. | |
| 2008/0099190 A1 | 5/2008 | Singh et al. | |
| 2008/0111099 A1 | 5/2008 | Singh et al. | |
| 2010/0038582 A1 | 2/2010 | Shimomura et al. | |
| 2010/0038583 A1* | 2/2010 | Shimomura et al. | 252/68 |
| 2010/0122545 A1 | 5/2010 | Minor et al. | |
| 2011/0023507 A1 | 2/2011 | Motta et al. | |
| 2012/0068105 A1 | 3/2012 | Rached et al. | |
| 2013/0055733 A1 | 3/2013 | Rached | |
| 2013/0055739 A1 | 3/2013 | Rached | |
| 2013/0061613 A1 | 3/2013 | Rached | |
| 2013/0299733 A1 | 11/2013 | Boussand | |
| 2014/0110623 A1 | 4/2014 | Boutier et al. | |
| 2015/0184051 A1 | 7/2015 | Rached | |
| 2016/0031773 A1 | 2/2016 | Bonnet et al. | |
| 2016/0032165 A1 | 2/2016 | Boussand | |

FOREIGN PATENT DOCUMENTS

| | | |
|---|---|---|
| CA | 2094856 A1 | 10/1993 |
| EP | 1227108 * | 7/2002 |
| EP | 2138558 A1 | 12/2009 |
| JP | 4-110388 | 4/1992 |
| JP | H06145104 | 5/1994 |
| JP | H08-104896 A | 4/1996 |
| JP | H08-503975 A | 4/1996 |
| JP | H09302370 | 11/1997 |
| JP | H11-228984 A1 | 8/1999 |
| JP | 2006-291142 A | 10/2006 |
| WO | WO 2004/037913 | 5/2004 |
| WO | WO2005/108522 | 11/2005 |
| WO | 2006094303 A2 | 9/2006 |
| WO | 2007126414 A1 | 11/2007 |
| WO | WO 2008/105256 A1 | 9/2008 |
| WO | WO 2008/105366 A1 | 9/2008 |
| WO | WO 2010/083100 A1 | 7/2010 |
| WO | 2011101620 A2 | 8/2011 |
| WO | 2011101622 A1 | 8/2011 |

OTHER PUBLICATIONS

U.S. Appl. No. 13/696,866, Wissam Rached, filed Nov. 8, 2012.
U.S. Appl. No. 13/697,027, Wissam Rached, filed Nov. 9, 2012.
U.S. Appl. No. 13/574,261, Wissam Rached, filed Jul. 20, 2012.
U.S. Appl. No. 13/824,495, Béatrice Boussand, filed Jul. 31, 2013.
U.S. Appl. No. 14/123,819, Jean-Christophe Boutier and Wissam Rached, filed Dec. 4, 2013.
U.S. Appl. No. 13/232,165, Wissam Rached and Béatrice Boussand, filed Sep. 14, 2011.
Bonnet, Phillippe, et al., U.S. Appl. No. 14/773,961 entitled "Composition Comprising HF and 1,3,3,3-Tetrafluoropropene," filed Sep. 9, 2015.
Boussand, Béatrice, U.S. Appl. No. 14/880,605 entitled "3,3,3-Trifluoropropene Composition," filed Oct. 12, 2015.
U.S. Appl. No. 14/645,031, Wissam Rached, filed Mar. 11, 2015.
Rached, Wissam, et al., U.S. Appl. No. 15/297,569 entitled "Composition Based on 2,3,3,3-Tetrafluoropropene," filed Oct. 19, 2016.
Rached, Wissam, U.S. Appl. No. 15/343,664 entitled "Heat-Transfer Fluid for a Centrifugal Compressor," filed Nov. 4, 2016.
Japanese Office Action and English-language (machine) translation issued in JP 2016-103039, dated Jun. 6, 2017, Japanese Intellectual Property Office, Tokyo, JP, 4 pages.

* cited by examiner

*Primary Examiner* — John R Hardee
(74) *Attorney, Agent, or Firm* — Buchanan Ingersoll & Rooney P.C.

(57) ABSTRACT

The subject of the present application is a composition comprising a lubricant based on polyol esters (POEs) or PVE and a refrigerant F comprising from 1 to 99% by weight of trans-1,3,3,3-tetrafluoropropene (trans-HFO-1234ze) and from 1 to 99% by weight of 1,1,1,3-tetrafluoroethane. The subject of the present application is also the use of said composition in refrigeration, air conditioning and heat pumps.

12 Claims, No Drawings

COMPOSITION BASED ON 1,3,3,3,-TETRAFLUOROPROPENE

The present application claims priority from French application Serial Number FR 10.57483 filed Sep. 20. 2010.

BACKGROUND OF THE INVENTION

The present invention relates to a composition containing trans-1,3,3,3-tetrafluoropropene and 1,1, 1,2-tetrafluomethane and at least one lubricant, capable of being used in refrigeration, air-conditioning and heat pumps.

The problems presented by substances which deplete the atmospheric ozone layer were dealt with at Montreal, where the protocol was signed imposing a reduction in the production and use of chlorofluorocarbons (CFCs). This protocol has been the subject of amendments which have required the abandoning of CFCs and have extended the regulations to other products, including hydrochlorofluorocarbons (HCFCs).

The refrigeration and air-conditioning industry has invested a great deal in the replacement of these refrigerants and it is because of this that hydrofluorocarbons (HFCs) have been marketed.

In the motor vehicle industry, the air-conditioning systems of vehicles sold in many countries have been changed from a chlorofluorocarbon (CFC-12) refrigerant to a hydrofluorocarbon (1,1,1,2-tetrafluoroethane: HFC-134a) refrigerant, which is less harmful to the ozone layer. However, from the viewpoint of the objectives set by the Kyoto protocol, HFC-134a (GWP =1430) is considered to have a high heating power. The contribution of a refrigerant to the greenhouse effect is quantified by a criterion, the GWP (Global Warming Potential), which summarizes the heating power by taking a reference value of 1 for carbon dioxide.

Hydrofluoroolefins (HFOs) have a low heating power and thus meet the objectives set by the Kyoto protocol. Document JP 4-110388 discloses hydrofluoropropenes as heat-transfer agents.

In the industrial sector, the refrigerating machines most commonly used are based on cooling by evaporation of a liquid refrigerant. After vaporization, the refrigerant is compressed and then cooled in order to return to the liquid state and thus continue the cycle.

The refrigeration compressors used are of the reciprocating, scroll, centrifugal or screw type. In general, internal lubrication of the compressors is essential in order to reduce wear and heating of the moving members, complete their leaktightness and protect them against corrosion.

In addition to good heat-transfer agent properties, in order for a refrigerant to be commercially accepted, it must in particular exhibit thermal stability and compatibility with the lubricants. Specifically, it is highly desirable for the refrigerant to be compatible with the lubricant used in the compressor, present in the majority of refrigeration systems. This combination of refrigerant and lubricant is important for the implementation and the efficiency of the refrigeration system; in particular, the lubricant should be sufficiently soluble or miscible in the refrigerant over the entire operating temperature range.

Thus, polyalkylene glycols (PAGs) have been developed as lubricants of HFC-134a in motor vehicle air conditioning. Tests for miscibility of 1,1,3,3,3-pentafluoropropene and 1,3,3,3-tetrafluoropropene with lubricants have been described in Example 2 of document WO 2004/037913. Compatibility tests have also been described in Example 3, with polyalkylene glycol. However, these tests do not specify the nature of the 1,3,3,3-tetrafluoropropene isomer.

Moreover, document WO 2005/108522 discloses an azeotropic composition of trans-1,3,3,3-tetrafluoropropene and 1,1,1,2-tetrafluoroethane.

Just recently, 2,3,3,3-tetrafluoropropene was chosen as a refrigerant for replacing HFC-134a in motor vehicle air conditioning.

The applicant has now developed a refrigerant and lubricant pairing which can be used in refrigeration, air conditioning and heat pumps.

DETAILED DESCRIPTION OF THE INVENTION

A subject of the present application is therefore a composition comprising at least one lubricant based on polyol esters (POEs) or on polyvinyl ether (PVE) and a refrigerant F comprising from 1 to 99% by weight of trans-1,3,3,3-tetrafluoropropene (trans-HFO-1234ze) and from 1 to 99% by weight of 1,1,1,2-tetrafluoroethane.

Preferably, the composition according to the present invention comprises at least one lubricant based on polyol esters (POEs) or on polyvinyl ether (PVE) and a refrigerant F comprising from 5 to 95% by weight of trans-1,3,3,3-tetrafluoropropene (trans-HFO-1234ze) and from 5 to 95% by weight of 1,1,1,2-tetrafluoroethane.

The composition which is particularly preferred comprises at least one lubricant based on polyol esters (POEs) or on polyvinyl ether (PVE) and a refrigerant F comprising from 30 to 91% by weight of trans-1,3,3,3-tetrafluoropropene (trans-HFO-1234ze) and from 9 to 70% by weight of 1,1,1,2-tetrafluoroethane. The refrigerant F may also comprise other hydrofluorocarbons. The fluid F has the advantage of being more effective than trans-HFO-1234ze and, in addition, the stability of the refrigerant in the presence of POE or PVE is greater compared with that of trans-HFO-1234ze in the presence of PAG.

Polyol esters are obtained by reaction of a polyol (an alcohol containing at least 2 hydroxyl groups —OH) with a monofunctional or plurifunctional carboxylic acid or with a mixture of monofunctional carboxylic acids. The water formed during this reaction is eliminated in order to prevent the reverse reaction (i.e. hydrolysis).

According to the present invention, the preferred polyols are those which have a neopentyl backbone, such as neopentyl glycol, trimethylolpropane, pentaerythritol and dipentaerythritol; pentaerythritol is the preferred polyol. The carboxylic acids may contain from 2 to 15 carbon atoms, it being possible for the carbon backbone to be linear or branched. Mention may in particular be made of n-pentanoic acid, n-hexanoic acid, n-heptanoic acid, n-octanoic acid, 2-ethylhexanoic acid, 2,2-dimethylpentanoic acid, 3,5,5-trimethylhexanoic acid, adipic acid and succinic acid, and mixtures thereof.

Some alcohol functions are not esterified, however their proportion remains low. Thus, the POEs can comprise between 0 and 5 relative mol % of $CH_2$—OH units relative to the —$CH_2$—O—(C=O)— units.

The preferred POE lubricants are those which have a viscosity of from 1 to 1000 centiStokes (cSt) at 40° C., preferably from 10 to 200 cSt, and advantageously from 30 to 80 cSt.

The polyvinyl ether (PVE) oils are preferably copolymers of the following 2 units:

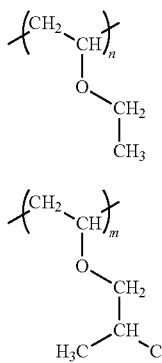

Unit 1

Unit 2

The properties of the oil (viscosity, solubility of the refrigerant and miscibility with the refrigerant in particular) can be adjusted by varying the m/n ratio and the sum m+n. The preferred PVE oils are those which have 50 to 95% by weight of units 1.

According to one preferred embodiment of the invention, the lubricant represents between 10 and 50%, inclusive, by weight of the composition.

The refrigerant F may also comprise additives such as odorous compounds.

A subject of the present invention is also the use of the abovementioned composition in refrigeration, in particular domestic or commercial refrigeration, cold rooms, the food industry, the processing industry, refrigerated transport (trucks, boats); air conditioning, in particular domestic, commercial or industrial air conditioning, where the appliances used are chillers or direct expansion appliances; and heat pumps, in particular medium- and high-temperature heat pumps.

By virtue of their low glide temperature, the compositions according to the present invention can be used both in equipment with dry-expansion evaporators and in equipment with evaporators operating in a flooded system.

Experimental Section

The thermal stability trials are carried out according to standard ASHRAE 97-2007: "sealed glass tube method to test the chemical stability of materials for use within refrigerant systems".

The test conditions are as follows:
weight of refrigerant: 2.2 g
weight of lubricant: 5 g
temperature: 200° C.
duration: 14 days The lubricant is introduced into a 42.2 ml glass tube. The tube is then evacuated under vacuum and then the refrigerant F is added thereto. The tube is then welded in order to close it and placed in an oven at 200° C. for 14 days.

At the end of the test, various analyses are carried out:

the gas phase is recovered in order to be analysed by gas chromatography: the main impurities were identified by GC/MS (gas chromatography coupled with mass spectrometry). The impurities coming from the refrigerant F and those coming from the lubricant can thus be combined;

the lubricant is analysed: colour (by spectrocolorimetry, Labomat DR Lange LICO220 Model MLG131), water content (by Karl Fischer coulometry, Mettler DL37) and acid number (by quantitative determination with 0.01N methanolic potassium hydroxide).

Three commercial lubricants were tested: the PAG ND8 oil, the POE Ze-GLES RB68 oil and the PVE FVC 68D oil.

| | PAG ND8 | | POE Ze-GLES RB68 | | PVE FVC 68D |
|---|---|---|---|---|---|
| Refrigerant | HFC-134a | Trans-HFO-1234ze | HFC-134a | Trans-HFO-1234ze | Trans-HFO-1234ze |
| By-products in the gas phase: | | | | | |
| from the refrigerant | 100 ppm | 4000 ppm + 6000 ppm (HFO-1234yf) | 100 ppm | 500 ppm + 1500 ppm (HFO-1234yf) | 3% + 1800 ppm (HFO-1234yf) |
| from the lubricant | 1.5% | 2% | 500 ppm | 800 ppm | 2% |
| Analysis of the lubricant: | | | | | |
| colour | 400 Hazen | 17 Gardner | 300 Hazen | 300 Hazen | 6 Gardner |
| water content | 1200 ppm | 1100 ppm | 160 ppm | 500 ppm | 500 ppm |
| acid number | 1.5 mg KOH/g | >10 mg KOH/g | 0.3 mg KOH/g | 0.6 mg KOH/g | 1.1 mg KOH/g |

It is noted that trans-HFO-1234ze in the presence of POE or PVE improves the stability of the lubricant. In addition, in the presence of POE, the stability of the refrigerant is also improved.

Applications

Thermodynamic performance of the systems using the mixtures in question

Calculation Tools

The RK-Soave equation is used for the calculation of the densities, enthalpies, entropies and the liquid-vapour equilibrium data of the mixtures. The use of this equation requires knowledge of the properties of the pure substances used in the mixtures in question and also the coefficients of interaction for each binary combination.

The Data Necessary for Each Pure Substance are:

boiling point, critical pressure and temperature, curve of pressure as a function of temperature starting from the boiling point to the critical point, saturated liquid and saturated vapour densities as a function of temperature.

The data on HFCs are published in the ASHRAE Handbook 2005 chapter 20 and are also available under Refrop (software developed by NIST for calculating the properties of refrigerants).

The HFO temperature-pressure curve data are measured by the static method. The critical pressure and temperature are measured using a C80 calorimeter sold by Setaram. The densities, at saturation as a function of temperature, are measured by means of the vibrating tube densimeter technology developed by the laboratories of the école des Mines de Paris [French Engineering School].

Coefficient of Binary Interaction:

The RK-Soave equation uses coefficients of binary interaction to represent the behaviour of products in mixtures. The coefficients are calculated according to experimental liquid-vapour equilibrium data.

The technique used for the liquid-vapour equilibrium measurements is the static analytical cell method. The equilibrium cell comprises a sapphire tube and is equipped with two Rolsitm electromagnetic samplers. It is immersed in a cryothermostat bath (Huber HS40). Magnetic stirring driven by a magnetic field rotating at a variable speed is used to accelerate the reaching of the equilibria. The sample analysis is carried out by gas chromatography (HP5890 series II) using a katharometer (TCD).

HFC-134a/Trans-HFO-1234ze

The liquid-vapour equilibrium measurements on the HFC-134a/trans-HFO-1234ze binary combination are carried out for the following isotherm. 20° C.

Compression System

Consider a compression system equipped with an evaporator, a condenser, a liquid-vapour exchanger (internal exchanger), a screw compressor and a pressure regulator.

The system operates with 15° C. of overheat and an internal exchanger between the outlets of the condenser and of the evaporator.

The isentropic efficiency of the compressors depends on the compression ratio. This efficiency is calculated according to the following equation:

$$\eta_{isen} = a - b(\tau - c)^2 - \frac{d}{\tau - e} \quad (1)$$

For a screw compressor, the constants a, b, c, d and e of the isentropic efficiency equation (1) are calculated according to the standard data published in the "Handbook of air conditioning and refrigeration, page 11.52".

The coefficient of performance (COP) is defined as being the useful power supplied by the system over the power provided or consumed by the system.

The Lorenz coefficient of performance (COPLorenz) is a reference coefficient of performance. It depends on temperatures and is used to compare the COPs of the various refrigerants.

The Lorenz coefficient of performance is defined as follows: (the temperatures T are in K)

$$T_{average}^{condensor} = T_{inlet}^{condensor} - T_{outlet}^{condensor} \quad (2)$$

$$T_{average}^{evaporator} = T_{outlet}^{evaporator} - T_{inlet}^{evaporator} \quad (3)$$

The Lorenz COP in the Case of Conditioned Air and Refrigeration:

$$COPlorenz = \frac{T_{average}^{evaporator}}{T_{average}^{condensor} - T_{average}^{evaporator}} \quad (4)$$

The Lorenz COP in the Case of Heating:

$$COPlorenz = \frac{T_{average}^{condensor}}{T_{average}^{condensor} - T_{average}^{evaporator}} \quad (5)$$

For each composition, the coefficient of performance of the Lorenz cycle is calculated as a function of the corresponding temperatures.

The %COP/COPLorenz is the ratio of the COP of the system relative to the COP of the corresponding Lorenz cycle.

Results in Cooling Mode

In cooling mode, the compression system operates between an evaporation temperature of −5° C. and a condensation temperature of 50° C.

The values of the constituents (HFC-134a, trans-HFO-1234ze) for each composition are given as percentage by weight.

| | | | | | | | | | | | |
|---|---|---|---|---|---|---|---|---|---|---|---|
| | | | | | Cooling mode | | | | | | |
| HFO-1234ze | HFC-134a | Temp evap inlet (° C.) | Temp comp outlet (° C.) | T condensation (° C.) | T pressure regulator | Evap P (bar) | Cond P (bar) | Ratio (w/w) | Glide | Comp efficiency | % CAP | % COP/COPLorenz |
| HFO-1234ze | | −5 | 73 | 50 | 42 | 1.8 | 10.0 | 5.6 | 0.00 | 74.8 | 100 | 54 |
| 5 | 95 | −5 | 81 | 50 | 42 | 2.4 | 13.1 | 5.4 | 0.03 | 75.9 | 136 | 56 |
| 10 | 90 | −5 | 81 | 50 | 42 | 2.4 | 13.0 | 5.4 | 0.07 | 75.8 | 135 | 55 |
| 20 | 80 | −5 | 80 | 50 | 42 | 2.3 | 12.8 | 5.5 | 0.16 | 75.6 | 131 | 55 |
| 30 | 70 | −5 | 79 | 50 | 42 | 2.3 | 12.6 | 5.5 | 0.26 | 75.3 | 128 | 55 |
| 40 | 60 | −5 | 79 | 50 | 42 | 2.2 | 12.3 | 5.6 | 0.34 | 75.1 | 124 | 54 |
| 50 | 50 | −5 | 78 | 50 | 42 | 2.1 | 12.0 | 5.6 | 0.40 | 74.9 | 120 | 54 |
| 60 | 40 | −5 | 78 | 50 | 42 | 2.1 | 11.7 | 5.7 | 0.44 | 74.7 | 116 | 54 |
| 70 | 30 | −5 | 77 | 50 | 42 | 2.0 | 11.3 | 5.7 | 0.43 | 74.6 | 112 | 54 |
| 80 | 20 | −5 | 76 | 50 | 42 | 1.9 | 10.9 | 5.7 | 0.37 | 74.5 | 108 | 54 |
| 90 | 10 | −5 | 75 | 50 | 42 | 1.8 | 10.5 | 5.7 | 0.24 | 74.6 | 104 | 54 |
| 95 | 5 | −5 | 74 | 50 | 42 | 1.8 | 10.3 | 5.7 | 0.14 | 74.6 | 102 | 54 |

Results in Heating Mode

In heating mode, the compression system operates between an evaporation temperature of −5° C. and a condensation temperature of 50° C.

The values of the constituents (HFC-134a, trans-HFO-1234ze) for each composition are given as percentage by weight.

| | | Heating mode | | | | | | | | | |
|---|---|---|---|---|---|---|---|---|---|---|---|
| | | Temp evap inlet (° C.) | Temp comp outlet (° C.) | T condensation (° C.) | T pressure regulator | Evap P (bar) | Cond P (bar) | Ratio (w/w) | Glide | Comp efficiency | % CAP | % COP/ COPLorenz |
| HFO-1234ze | | −5 | 73 | 50 | 42 | 1.8 | 10.0 | 5.6 | 0.00 | 74.8 | 100 | 62 |
| HFO-1234ze | HFC-134a | | | | | | | | | | | |
| 5 | 95 | −5 | 81 | 50 | 42 | 2.4 | 13.1 | 5.4 | 0.03 | 75.9 | 136 | 63 |
| 10 | 90 | −5 | 81 | 50 | 42 | 2.4 | 13.0 | 5.4 | 0.07 | 75.8 | 135 | 63 |
| 20 | 80 | −5 | 80 | 50 | 42 | 2.3 | 12.8 | 5.5 | 0.16 | 75.6 | 131 | 63 |
| 30 | 70 | −5 | 79 | 50 | 42 | 2.3 | 12.6 | 5.5 | 0.26 | 75.3 | 128 | 63 |
| 40 | 60 | −5 | 79 | 50 | 42 | 2.2 | 12.3 | 5.6 | 0.34 | 75.1 | 124 | 62 |
| 50 | 50 | −5 | 78 | 50 | 42 | 2.1 | 12.0 | 5.6 | 0.40 | 74.9 | 120 | 62 |
| 60 | 40 | −5 | 78 | 50 | 42 | 2.1 | 11.7 | 5.7 | 0.44 | 74.7 | 116 | 62 |
| 70 | 30 | −5 | 77 | 50 | 42 | 2.0 | 11.3 | 5.7 | 0.43 | 74.6 | 112 | 62 |
| 80 | 20 | −5 | 76 | 50 | 42 | 1.9 | 10.9 | 5.7 | 0.37 | 74.5 | 108 | 62 |
| 90 | 10 | −5 | 75 | 50 | 42 | 1.8 | 10.5 | 5.7 | 0.24 | 74.6 | 104 | 62 |
| 95 | 5 | −5 | 74 | 50 | 42 | 1.8 | 10.3 | 5.7 | 0.14 | 74.6 | 102 | 62 |

The invention claimed is:

1. Composition comprising at least one lubricant comprising at least one polyol ester and a refrigerant consisting of from 10 to 90% by weight of trans-1,3,3,3-tetrafluoropropene (trans-HFO-1234ze) and from 10 to 90% by weight of 1,1,1,2-tetrafluoroethane.

2. Composition according to claim 1, wherein the refrigerant consists of from 30 to 90% by weight of trans-1,3,3,3-tetrafluoropropene (trans-HFO-1234ze) and from 10 to 70% by weight of 1,1,1,2-tetrafluoroethane.

3. Composition according to claim 1, wherein the at least one polyol ester is obtained from a polyol having a neopentyl backbone.

4. Composition according to claim 3, wherein the polyol having a neopentyl backbone is selected from the group consisting of neopentyl glycol, trimethylolpropane, and dipentaerythritol.

5. Composition according to claim 1, wherein the at least one polyol ester is obtained from a linear or branched carboxylic acid containing from 2 to 15 carbon atoms.

6. Composition according to claim 1, wherein the at least one polyol ester is between 10 and 50% by weight of the composition.

7. Composition according to claim 1, wherein the refrigerant consists of from 40 to 90% by weight of trans-1,3,3,3-tetrafluoropropene (trans-HFO-1234ze) and from 10 to 60% by weight of 1,1,1,2-tetrafluoroethane.

8. Composition according to claim 1, wherein the refrigerant consists of from 50 to 90% by weight of trans-1,3,3,3-tetrafluoropropene (trans-HFO-1234ze) and from 10 to 50% by weight of 1,1,1,2-tetrafluoroethane.

9. Composition according to claim 1, wherein the refrigerant consists of from 20 to 80% by weight of trans-1,3,3,3-tetrafluoropropene (trans-HFO-1234ze) and from 20 to 80% by weight of 1,1,1,2-tetrafluoroethane.

10. Composition according to claim 1, wherein the refrigerant consists of from 15 to 85% by weight of trans-1,3,3,3-tetrafluoropropene (trans-HFO-1234ze) and from 15 to 85% by weight of 1,1,1,2-tetrafluoroethane.

11. Composition comprising at least one lubricant comprising at least one polyvinyl ether and a refrigerant consisting of from 5 to 95% by weight of trans-1,3,3,3-tetrafluoropropene (trans-HFO-1234ze) and from 5 to 95% by weight of 1,1,1,2-tetrafluoroethane, wherein the polyvinyl ether is a copolymer of the following two units:

Unit 1:

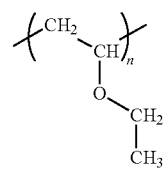

Unit 2:

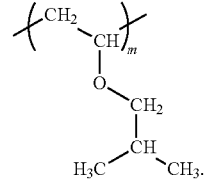

12. Composition according to claim 11, wherein the polyvinyl ether has from 50 to 95% by weight of Unit 1.

* * * * *